United States Patent [19]

Falzoni

[11] 4,317,389
[45] Mar. 2, 1982

[54] VEHICLE DRIVE TRANSMISSION SYSTEM
[75] Inventor: Gianluigi Falzoni, Turin, Italy
[73] Assignee: Fiat Auto S.p.A., Turin, Italy
[21] Appl. No.: 103,640
[22] Filed: Dec. 14, 1979

[30] Foreign Application Priority Data

Jan. 19, 1979 [IT] Italy .................... 67122 A/79

[51] Int. Cl.³ .................. F16H 37/00; F16H 37/08
[52] U.S. Cl. ........................... 74/689; 74/695;
74/740; 74/714; 74/694
[58] Field of Search .............. 74/689, 701, 705, 710,
74/695, 694, 681, 714, 740, 682, 665 GE

[56] References Cited

U.S. PATENT DOCUMENTS

| | | | |
|---|---|---|---|
| 687,173 | 11/1901 | Upton | 74/695 |
| 798,746 | 9/1905 | Normanville | 74/695 |
| 1,057,526 | 4/1913 | Calame | 74/695 |
| 2,932,216 | 4/1960 | Schou | 74/689 |
| 3,375,738 | 4/1968 | Love | 74/740 |
| 3,492,890 | 2/1970 | Hill et al. | 74/714 |
| 4,060,012 | 11/1977 | Gialosa | 74/689 |
| 4,136,581 | 1/1979 | Winter et al. | 74/689 |
| 4,138,837 | 2/1979 | Love | 74/740 X |

FOREIGN PATENT DOCUMENTS 1297673 11/1972 United Kingdom ............. 74/695

*Primary Examiner*—Leslie Braun
*Assistant Examiner*—Lawrence J. Gotts
*Attorney, Agent, or Firm*—Sughrue, Mion, Zinn, Macpeak & Seas

[57] ABSTRACT

A vehicle drive transmission system includes a continuously variable speed-control unit of the expansible pulley type whose output shaft is drivingly connected via a reduction gear unit to a differential gear. The differential gear has two coaxial output shafts which are connected to the half shafts of the vehicle's driving wheels. Both the reduction gear unit and the differential gear are epicyclic in form and are arranged coaxial with the output shaft of the speed control unit. To accommodate this compact arrangement, both the output shaft of the speed control unit and the input shaft of the reduction gear unit are made hollow so that one of the output shafts of the differential gear can extend therethrough.

1 Claim, 3 Drawing Figures

VEHICLE DRIVE TRANSMISSION SYSTEM

The present invention relates to a vehicle drive transmission system arranged to transmit drive from a vehicle's engine to its driving wheels via a continuously variable speed-control unit.

One known type of vehicle drive transmission incorporating a continuously variable speed control unit comprises a driving shaft connectable at one end to the vehicle's engine to be driven in rotation thereby; a hollow main shaft coaxially surrounding the driving shaft; a reversing unit operatively interposed between the main shaft and the end of the driving shaft remote from the engine, the said reversing unit being remotely controllable to assume a selected one of three operating conditions in which the main shaft is respectively arranged to rotate in the same sense as the driving shaft, to rotate in the opposite sense to the driving shaft, and to be drivingly disengaged from the driving shaft; a driven shaft extending parallel to the main shaft; a continuously-variable speed control unit including a driving pulley mounted on the main shaft, a driven pulley mounted on the driven shaft, and a V-belt passing around said pulleys, each pulley consisting of two facing conical discs, one of which is integral with the corresponding shaft and the other of which is axially movable along the shaft to effect the radial displacement of the V-belt; a reduction gear unit drivingly connected to the driven shaft; and a differential gear driven from the said reduction unit and provided with two output shafts drivingly connectable to the half shafts of the vehicle's driving wheels.

In known transmission systems of this type, the components are distributed between at least three parallel axes which makes these systems somewhat cumbersome and bulky.

The object of the present invention is to provide a transmission system of the aforementioned type of compact form.

In order to achieve this object, the present invention provides a transmission system of the type indicated above, in which the driven shaft is hollow and the reduction gear unit is of epicyclic form and is arranged coaxially adjacent the differential gear which is also of epicyclic form, the said reduction gear unit being provided with a hollow input shaft coaxial with the driven shaft and drivingly connected thereto, and the differential gear including two rotatable output members coaxial with the driven shaft and fast for rotation with respective ones of the output shafts of the differential gear, one said output shaft extending through both the hollow input shaft of the reduction gear unit and the said hollow driven shaft for connection with the corresponding driving wheel half shaft.

It will be appreciated that all the components of the transmission system are distributed between only two parallel axes which makes the system much more compact than known systems of the same type.

A vehicle drive transmission system embodying the invention will now be particularly described, by way of example, with reference to the accompanying diagrammatic drawings, in which.

Figure 1:
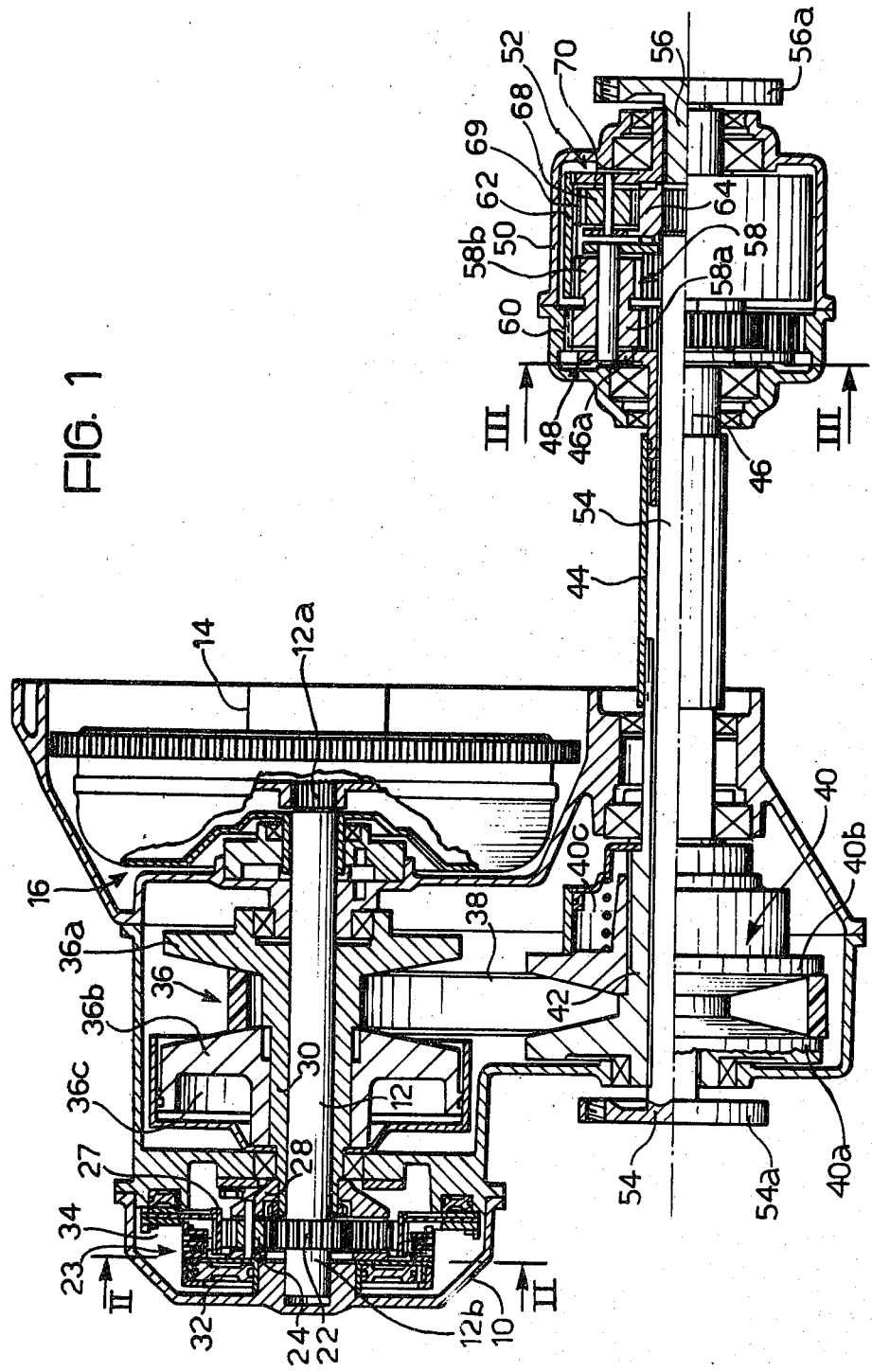
FIG. 1 is a partly cut-away schematic view of the transmission system.

As shown in the drawings, the transmission system includes a supporting structure 10 in the form of a housing within which a driving shaft 12 is rotatably mounted. One end 12a of the driving shaft 12 is couplable to the crankshaft 14 of the vehicle's engine (not illustrated) by means of a hydraulic coupling 16 of known type, the turbine of which is fast for rotation with the end 12a of the driving shaft 12. On the other end 12b of the driving shaft 12, there is splined a sun wheel 22 forming part of an epicyclic reversing unit 23 of known type. The reversing unit 23, illustrated in detail in FIG. 2, comprises three planet wheels 24 equiangularly spaced around the sun wheel 22 and meshing therewith, and three planet wheels 26 each of which meshes with a respective one of the planet wheels 24 and with a crown wheel 27 coaxially surrounding the sun wheel 22. The planet wheels 24 and 26 are rotatable supported, on a gear train carrier 28 which is rigidly secured to a hollow main shaft 30 rotatably mounted coaxially with the driving shaft 12. Associated with the crown wheel 27 are a friction clutch 32 and a brake 34 both of known type and both of which can be actuated hydraulically via a hydraulic circuit (not shown). The friction clutch 32 serves to couple the crown wheel 27 fast for rotation with the gear train carrier 26. The brake 34 is operable to lock the crown wheel 27 relative to the fixed structure 10.

The reversing unit 23 can assume any one of three operating conditions as selected by remote control. In a first operating condition, the friction clutch 32 is operated to couple the crown wheel 27 fast for rotation with the gear train carrier 28. In this condition, the crown wheel 27, the gear train carrier 28 and the hollow main shaft 30 will rotate in the same sense of rotation as the driving shaft 12.

In a second operating condition of the reversing unit 23, the brake 34 locks the crown wheel 27 to the fixed supporting structure 10. In this condition the gear train carrier 28 and therefore the main shaft 30 rotate in a sense opposite to the sense of rotation of the driving shaft 12.

In the third operating condition of the unit 23, both the friction clutch 32 and the brake 34 are disengaged so that rotation of the driving shaft 12 is ineffective to cause driving rotation of the gear train carrier 28 and therefore of the main shaft 30.

A driving pulley 36 is splined to the main shaft 30 and consists of two facing conical discs 36a, 36b. The conical disc 36a is integral with the main shaft 30, whereas the conical disc 36b is axially slidable along the shaft 30. The driving pulley 36 is arranged to transmit rotary motion of the shaft 30 via a V-belt 38 to a driven pulley 40 splined to a driven shaft 42 extending parallel to the main shaft 30. The driven pulley 40 is similar to the driving pulley 36 and consists of two facing conical discs 40a, 40b one of which (disc 40a) is integral with the driven shaft 42 and the other of which (disc 40b) is axially slidable along the shaft 42. Axial movement of discs 36b and 40b of the driving pulleys 36 and 40 respectively is effected hydraulically, in the usual way, by regulating the entry of hydraulic fluid into the interior of a chamber 36c and of a chamber 40c respectively adjacent to the sliding discs 36b, 40b of the pulleys 36 and 40. This regulation is effected by a regulatory device, not shown. In this way it is possible to vary the effective diameters of the pulleys 36 and 40 and thereby vary the velocity ratio of transmission between the main shaft 30 and the driven shaft 42. Thus, the arrangement of the pulleys 36, 40 and V-belt 38 together constitute a continuously variable speed control unit.

The driven shaft 42 is hollow and is rotatably supported by the fixed structure 10. One end of the shaft 42 is connected by means of an intermediate tubular shaft 44, to a hollow shaft 46 coaxially aligned with the said driven shaft 42. The hollow shaft 46 constitutes the input shaft of an epicyclic reduction gear unit 48 housed in a casing 50, fixed to the engine of the vehicle. The casing 50 also contains an epicyclic differential gear 52 which is coaxially arranged with the reduction gear unit 48 and serves to transmit the rotary motion of the driven shaft 42 to the half shafts of the vehicle's driving wheels.

The end of the input shaft 46 remote from the driven shaft 42, is formed as a gear train carrier 46a. This carrier 46a rotatably mounts a trio of planet wheels 58 equi-angularly spaced around the input shaft 46. Each planet wheel 58 is composed of two integral toothed gears 58a and 58b of which the gear 58a has a greater number of teeth than the gear 58b. The toothed gears 58a mesh with a first crown wheel 60 integral with the casing 50, while the toothed gears 58b mesh with a second crown wheel 62 rotatable relative to the casing 50. This crown wheel 62 serves to drivingly interconnect the reduction gear unit with the adjacent differential gear 52.

Figure 2:
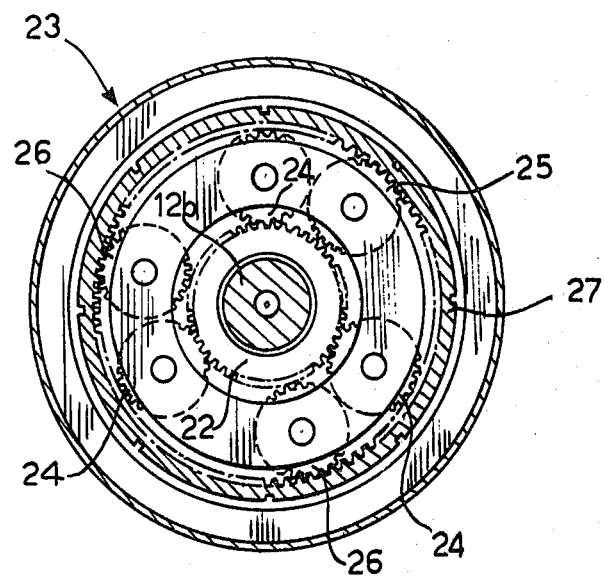
FIG. 2 is a section on line II—II of FIG. 1 to an enlarged scale.
Figure 3:
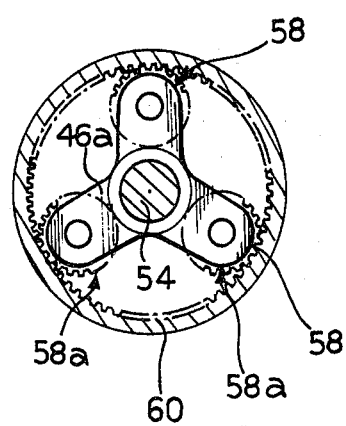
FIG. 3 is a section on line III—III of FIG. 1.

The differential gear is of the epicyclic type, and has a structure similar to the structure of the reversing unit 23 illustrated in FIG. 2. The differential gear 52 comprises a sun wheel 64 and two trios of planet wheels 68, 69. The two trios of planet wheels 68, 69 are similar to planet wheels 24, 26 previously described with reference to FIG. 2, and inter-mesh with each other in pairs of wheels 68 and 69. In addition, the planet wheels 68 mesh with the crown wheel 62 and the planet wheels 62 mesh with the sun wheel 64. The sun wheel 64 is splined to one end of a first output shaft 54 which extends coaxially through the input shaft 46 of the reduction gear unit 48, the intermediate shaft 44 and the driven shaft 42. The end of the output shaft 54 remote from the sun wheel 64 projects outside the housing formed by the supporting structure 10 and carries a radial flange 54a which serves to connect the shaft 54 to the half shaft of one of the vehicle's driving wheels.

The gear train carrier 70 is splined to one end of a second output shaft 56 which is coaxial with the first output shaft 54 and is substantially shorter than this shaft 54. The second output shaft 56 projects outside the casing 50 and is provided at its outer end with a radial flange 56a which serves to connect the shaft 56 to the half shaft of the other driving wheel of the vehicle. In use, the differential gear 52 operates in known manner to distribute torque between the output shaft 54 driven by the sun wheel 64 and the output shaft 56 driven by the gear train carrier 70.

It will be appreciated from the preceding description that the described transmission system is particularly compact and of modest dimensions, with all its components being arranged on two parallel axes which correspond to the axes of the pulleys 36, 40 of the continuously variable speed control unit.

I claim:

1. In a motor vehicle, an improved drive transmission system for transmitting drive from the engine of the vehicle to the half shafts of the vehicle's driving wheels, said system comprising:

a driving shaft connectable at one end to the vehicle's engine to be driven in rotation thereby;

a hollow main shaft coaxially surrounding said driving shaft;

a reversing unit operatively interposed between the main shaft and the end of the driving shaft remote from the engine, the said reversing unit being remotely controllable to assume a selected one of three operating conditions in which said main shaft is respectively arranged to rotate in the same sense as said driving shaft, to rotate in the opposite sense to said driving shaft, and to be drivingly disengaged from the driving shaft;

a driven shaft extending parallel to said main shaft;

a continuously-variable speed control unit including a driving pulley mounted on said main shaft, a driven pulley mounted on said driven shaft, and a V-belt passing around said pulleys, each pulley consisting of two facing conical discs, one of which is integral with the corresponding shaft and the other of which is axially movable along said shaft to effect the radial displacement of the V-belt;

a reduction gear unit drivingly connected to the driven shaft; and a differential gear driven from the said reduction unit and provided with two output shafts drivingly connectable to the said half shafts of the vehicle's driving wheels, the improvement residing in that said driven shaft is hollow and that said reduction gear unit is of epicyclic form and is arranged coaxially adjacent the differential gear which is also of epicyclic form, the said reduction gear unit being provided with a hollow input shaft coaxial with said driven shaft and drivingly connected thereto, and the differential gear including two rotatable output members coaxial with the driven shaft and fast for rotation with respective ones of said two output shafts, one said output shaft extending through both the said hollow input shaft of the reduction gear unit and the said hollow driven shaft for connection with the corresponding one of the said driving-wheel half shafts, wherein the reduction gear unit comprises a gear train carrier integral with said hollow input shaft, three planet wheels rotatably mounted on said carrier and equi-angularly spaced around said input shaft, and a crown wheel coaxial with the input shaft and integral with the said casing, each said planet wheel being composed of a first toothed gear meshing with the said crown wheel and a second toothed gear side-by-side with the first toothed gear and having a lesser number of teeth than that gear, the said two rotatable output members of the differential gear respectively comprising a sun wheel splined to said one output shaft and a gear train carrier splined to the other said output shaft, the differential gear further including a first and second trio of planet wheels rotatably mounted on the said gear train carrier of the differential gear and so arranged that each wheel of the first trio meshes with a respective one of the wheels of the second trio, the second trio of planet wheels also meshing with the sun wheel of the differential gear and the reduction unit and differential gear being drivingly interconnected by a common crown wheel which meshes both with the second toothed gears of the reduction-unit planet wheels and with the first planet-wheel trio of the differential gear.

* * * * *